Figure 1:
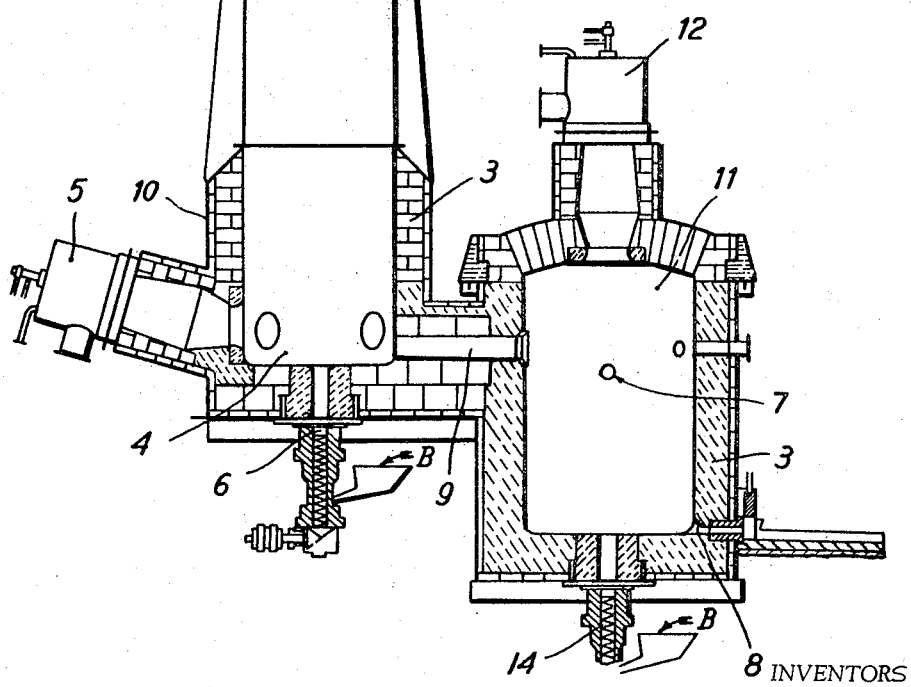

Aug. 29, 1967  A. CARLI ETAL  3,338,707
PLANTS FOR THE IGNEOUS EXTRACTION OF METALS FROM THEIR
ORES AND REMELTING OF THE METALS FOR FOUNDRY
PURPOSES OR FURTHER TREATMENT
Filed March 2, 1964  2 Sheets-Sheet 1

INVENTORS
Adriano Carli
Walter P. Kollakowski
By Stevens, Davis, Miller + Mosher
ATTORNEYS 3,338,707
PLANTS FOR THE IGNEOUS EXTRACTION OF METALS FROM THEIR ORES AND REMELTING OF THE METALS FOR FOUNDRY PURPOSES OR FURTHER TREATMENT
Adriano Carli, Genoa, and Walter P. Kollakowski, Bergamo, Italy, assignors of one-third to Dalmine S.p.A., Milan, Italy, a corporation of Italy
Filed Mar. 2, 1964, Ser. No. 348,337
Claims priority, application Italy, Mar. 15, 1963, 32,967/63
4 Claims. (Cl. 75—41)

The present invention relates to improvements on plants for the igneous extraction of metals from their ores and to the remelting of the metals for foundry purposes or further treatment.

Known in the art is a type of plant for melting scrap iron and metallic materials and also for reducing their oxides, both formed during the melting operation and charged together with scrap iron, without using coke which is instead indispensable in all of the furnaces known to date: cupolas, blast furnaces, and electrical reducing furnaces. In this type of plant, we can use, instead of coke, any kind of combustible material (naphtha, natural gas, powdered coal, etc.) to generate the heat which is required by the process and any carbonaceous substance whatever to supply the amount of carbon necessary to the chemical reactions for reducing the oxides and carburizing the melt metal.

From the constructive standpoint, these possibilities can be accomplished by a shaft furnace in the upper end or orifice of which the materials to be melted or reduced are charged, whilst at the lower portion of which are placed the burners which furnish the heat necessary for the melting; yet lower, the same furnace is completed by a closed crucible or pot where the melted metal is collected. The forced admission of the carbonaceous substances for developing the chemical reactions is made in the crucible, that is directly in the melted metal, by means of feeders applied to the walls of the crucible.

In practice, it has been found necessary to introduce some substantial modifications in the design of the furnace diagrammatically described above in order to render the continuous operation more reliable and convenient.

Such modifications are the objects of the present invention and are hereinafter specified:

(a) *Double crucible*

The practical experience acquired after numerous experiments has proved the necessity that the furnace be provided with a double crucible, that is a crucible and a fore-crucible in a manner which is apparently similar to that used for some types of existing melting furnaces (cupolas), whereas it constitutes an absolute novelty for the reducing furnaces. The substantial difference is that in this case they are crucibles which are both active, that is of the type effecting chemical-metallurgical operations and thermal operations to furnish the heat required for effecting the metallurgical process and for adjusting the metal tapping or casting temperature.

The need of the provision of two crucibles derives from various circumstances which are hereinafter listed:

A single crucible below the shaft, as provided to date, would require a remarkable depth to assure a sufficient content of melted metal, but this inevitably results in the lowering of the crucible bottom and hence in the increasing of the space between said bottom and the burners, that is the heat source; as a consequence, there is the danger of cooling and partial solidification of the metal at the bottom of the crucible.

In the case of a single crucible, the variations in the level of the melted metal are very high, as a consequence of the periodic tappings of the metal. This causes abnormalities in the operation, with the resulting danger of leaving the feeders of carbonaceous substances placed on the crucible walls uncovered, that is exposed to the oxidizing and dissolving actions of the burners.

In the crucible, the composition of the tapped metal is subjected to remarkable variations since the metal is more carbonized in the lower portion than in the upper portion, and in the latter zone the de-oxidizing and reducing reactions can still be in course while the metal is tapped, thereby degrading the quality thereof.

The limited content of the single crucible necessitates very frequent tapping operations which can be expensive. A delay in effecting the tapping operation or an unforeseen quickening of the melting activity can cause an increase in the level of the melted material with very serious danger if said level reaches the burners.

The quantity of metal which is collected in the crucible and which can be taken away for each tapping operation is unknown and therefore it is not possible to regulate at will the amounts taken away.

With a double crucible, on the other hand, the level of the melted material in the furnace is always constant and, therefore, the regularity of the operation of the furnace is better, there is no danger of damaging the burners or feeders, the composition of the tapped metal is more even and can be more easily regulated, and the tapping operations can be effected with more freedom as to the quantity and time.

(b) *Double feeder*

Here two feeders are placed in the crucible and in the fore crucible. This constructive arrangement permits the better regulation of the development of the reactions and the degree of the carburizing of the metal. Moreover, it avoids the danger of admitting excess carbon into the first crucible, since the eventual deficiencies can be offset by more substantial additions made in the second crucible. Finally, with this arrangement it is easier to add and control the amount of correcting and bonding final substances to the melted metal.

The first feeder is placed below the liquid surface of the bath and preferably at the bottom of the crucible, so as to always assure the inlet of the carbonaceous substances within the melted material. The function of this feeder is mainly of a chemical nature in order to assure that the freshly melted oxides are reduced precisely at the higher temperature zone. Thus, the permanent presence of even small quantities of melted oxides in the crucible is avoided, the action of the melted oxides being notoriously dangerous for the refractory linings.

The second feeder, on the other hand, which is placed in a similar manner in the second crucible, has mainly the function of carburizing the melted metal and regulating the composition according to the requirements of the further metallurgical treatment.

Of course each of said two feeders can be devised and constructed as a set of feeders and not as a single feeder in the event that the furnace is of remarkable size.

(c) Intensive burners of great thermal power

The experience acquired in adopting the different experimental, constructive solutions has proved the superiority of the plant comprising few burners of great power in comparison to that originally provided with a number of small burners circumferentially arranged.

This arrangement of the burners, which is suitable for any type of fuel which we may decide to use, is obtained by providing a plurality of single combustion chambers, one for each burner, suitably shaped to perform the maximum efficiency and applied outside the metallic casing of the furnace.

In order to reach the required high temperatures and an intensive combustion, said combustion chambers are of a type suitable for furnishing the heat required by the metallurgical process and for increasing the temperature of the metal to the desired point during the tapping operation.

(d) Provision of supplementary burners in the second crucible

The distribution of the coal feeders in the two crucibles has made necessary also the corresponding distribution of the burners. The burners, suitably applied in the second crucible (one or more according to the size of the furnace), permit the temperature to be kept always elevated and adjusted to the best level, and assure obtaining the continuous fluidity of the metal which passes from the first crucible into the second crucible.

The additional heating can be adjusted, independently from the main heating, according to the intensity of the deoxidation and carburizing which develops in the second crucible, and also according to the final temperature at which it is desired that the metal tapping be accomplished. It should be emphasized that this temperature is remarkably different depending upon whether we desire to tap a high or a low carbon cast iron (about 1%, for example). Said freedom of adjusting the combustion intensity is, therefore, indispensable, when the production of melted metal having different carbon contents is desired (to which correspond, as it is known, remarkably different melting temperatures).

(e) Dimensional ratios

The experience obtained over a long period of time in the unit production has rendered possible the detecting and determining of the most suitable size of the various sections of the furnace. Therefore, it was determined that the ratios between the diameter of the crucible and the height of the shaft (measured from the plane of the burners to the reduced charging door or throat of the furnace), should be within the ratios from 1:2 to 1:6. Moreover, the diameter of the reduced charging door of the shaft should be within between 0.6 and 1 time the diameter of the crucible. Over the shaft charging door a funnel-like flare is provided, in order to facilitate the charging. Finally, the lower portion of the shaft, which is lined with the refractory material, has a height within 1:1 and 1:3 times the diameter of the shaft.

The shape of the shaft, in order to facilitate the lowering of the charge, should be widened at the bottom thereof. One portion of said shaft can be of metal plate with no lining of internal refractory material, while it is cooled at the outside with showers of water or other closed circuit cooling systems. Below this metallic portion, a further frusto-conical or cylindrical portion which is lined with refractory material is provided, this portion completing the shaft and connecting the combustion chambers of the burners and the underlying crucible.

For greater clarity and by way of non-limitative example, one of the possible constructive embodiments of an improved furnace according to the invention is illustrated in the accompanying drawings.

(f) Description

The drawings illustrate the vertical sectional view (FIGURE 1) and the plan view (FIGURE 2) of the furnace without accessories and auxiliary portions such as stock charging apparatus, carbonaceous substance-supplying apparatus for the several feeders (diagrammatically indicated), burners, fuel supplying systems and others which do not form a part of this invention.

Figure 2:
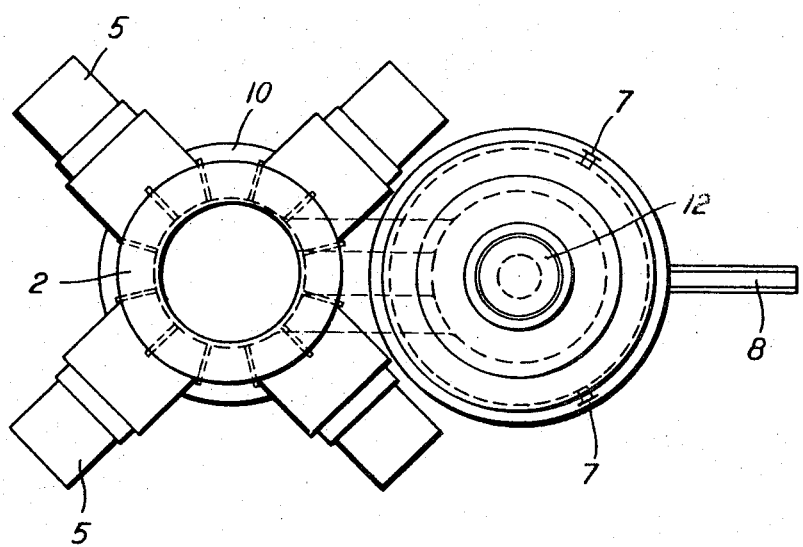

The charging of the furnace takes place by means of conventional devices diagrammatically indicated by arrow A in FIGURE 1, through the free door or throat of shaft 1 and is facilitated by the funnel-shaped flare 2. The gases or fumes from the lower section of the shaft are discharged freely into the atmosphere through said throat and, depending upon the case, in order to facilitate the discharge thereof a hood or chimney (not shown in the drawing) provided to carry said fumes into the atmosphere can be placed above the throat of the furnace.

As the charging stock descends in the furnace, it meets with the stream of warm gas, rises in temperature and passes from the metallic shaft 1 to shaft 10 which is lined with refractory materials 3, where it becomes incandescent and is melted in a crucible 4 due to the concentrated action of burners 5.

The forced feeders 6 for the materials to be treated are charged by means of devices, which are diagrammatically indicated by arrow B, and they assure the continuous presence of carbonaceous substances on the bottom of the crucible, said carbonaceous substances, by chemically reacting with the oxides and the melted metal, facilitate the completion of the melting (the contact with carbon lowering the melting point of ferrous material), as well as the deoxidation and reduction thereof.

The melted material then passes from the first crucible 4, through a connecting channel 9 into the second crucible 11 where, by the action of burners 12, the temperature is increased if necessary and it is mixed with other carbon supplied by the feeders 14 which completes the deoxidation thereof, in the event that the deoxidation has not had sufficient time to be completed in the first crucible, whereby it permits the final carbon contents to be adjusted to the desired rate.

When a sufficient quantity of metal is collected in the second crucible, said metal is tapped by means of conventional procedures through the lower tapping hole 8, while slags or loups are taken away from the upper hole 7.

All of the furnace is covered with a strong metallic jacket which is cooled with water in the portions subjected to the highest temperature, according to the conventional art for such furnaces.

We claim:

1. A furnace for melting and reducing metallic materials, comprising a furnace shaft, a first crucible connected to the lower end of said shaft and adapted to contain a molten metal bath, feeding means positioned beneath the normal level of said bath to introduce carbonaceous material into said bath, a second crucible, and conduit means operatively connecting said first crucible to said second crucible, feeding means to introduce carbonaceous material beneath the surface of molten metal in said second crucible, heating means to heat said first crucible and said second crucible, and means to independently withdraw molten metal and slag from said second crucible.

2. A furnace according to claim 1, wherein said heating means include a plurality of burners disposed in each crucible, each burner having a combustion chamber disposed at least in part outside of said furnace shaft.

3. A method for treating a metal ore, comprising the steps of introducing the ore into the upper end of a furnace shaft, melting the ore to establish a molten metal bath in a crucible, introducing a carbonaceous material into said bath beneath the surface thereof, passing a portion of the molten metal into a second crucible, introducing additional carbonaceous material into the molten metal in said second crucible, and separately recovering slag and metal from said second crucible.

4. A method according to claim 3, wherein said carbonaceous material is other than coke, and further comprising heating the molten metal in said second crucible independently of the heat supplied to the first crucible, and supplying heat to each of said crucibles by combustion burners.

References Cited

UNITED STATES PATENTS

| | | | |
|---|---|---|---|
| 1,315,551 | 9/1919 | Hampton | 266—28 |
| 1,357,781 | 11/1920 | Koppers | 266—25 |
| 2,219,046 | 10/1940 | Koller et al. | 266—25 |
| 2,339,192 | 1/1944 | Roberson | 266—25 |
| 2,952,533 | 9/1960 | Cuscoleca et al. | 266—25 |
| 2,960,330 | 11/1960 | Lobbecke | 266—25 |
| 3,116,143 | 12/1963 | Reichl | 266—25 |

JOHN F. CAMPBELL, *Primary Examiner.*

M. L. FAIGUS, *Assistant Examiner.*